Jan. 3, 1950    F. D. CHEW    2,493,391
PROCESS OF RECOVERING SCRAP METAL
Original Filed July 30, 1943
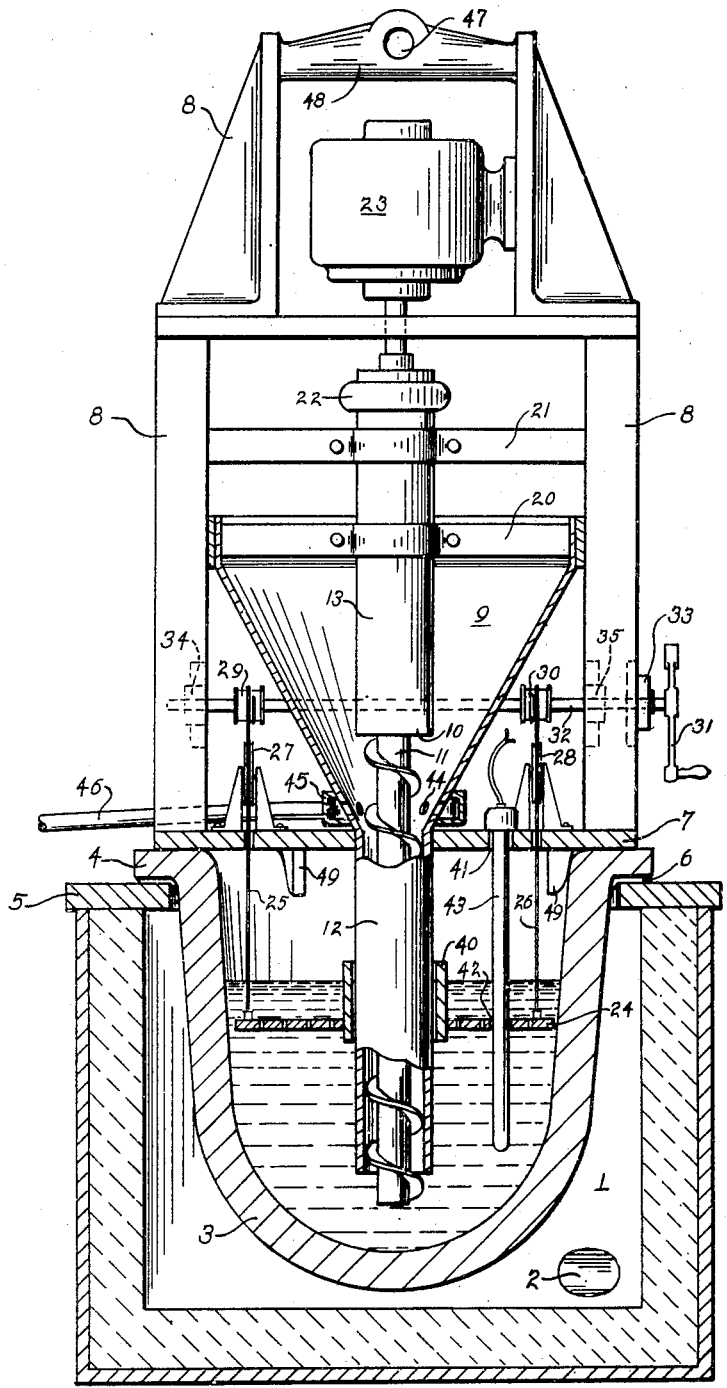
INVENTOR
Frank D. Chew
BY George B. Todd
ATTORNEY Patented Jan. 3, 1950

2,493,391

UNITED STATES PATENT OFFICE 2,493,391

PROCESS OF RECOVERING SCRAP METAL

Frank D. Chew, Detroit, Mich., assignor to Aluminum Company of America, Pittsburgh, Pa., a corporation of Pennsylvania Original application July 30, 1943, Serial No. 496,771. Divided and this application January 25, 1947, Serial No. 724,310

5 Claims. (Cl. 75—67)

This invention relates to the recovery of highly oxidizable metals, such as magnesium and aluminum, and more particularly it relates to an apparatus and a process for the reclamation of relatively fine pieces of metallic magnesium scrap. This application is a division of application Serial No. 496,771 filed July 30, 1943, has been issued August 26, 1947 as Patent 2,426,389.

In the fabrication of metallic articles, a relatively large amount of scrap in the form of chips, borings, sawdust, turnings, scalpings and the like is produced, particularly in machining the articles to final size and shape or in grinding and sandblasting the articles at some stage in the fabricating procedure. This scrap by the very nature of the machining, grinding or sandblasting operation is relatively finely divided, and consequently a large surface area for a given weight of this material is exposed to the atmosphere. In this state, highly oxidizable metals, such as metallic magnesium, readily ignite at moderately high temperatures and burn vigorously, and for all practical purposes the metal is thereafter lost.

To recover this finely divided metallic scrap, particularly magnesium scrap, the general practice has been to submerge small portions of the scrap in molten salts or in molten metal having a composition similar to that of the scrap, with a hand puddler and there holding the scrap until it is completely fused with the melt. This practice is not only slow and tedious, but in the case of magnesium, due to the fact that the specific gravity of the particles is lower than that of the melt, considerable difficulty has been encountered in preventing these particles from rising to the surface and burning; consequently the recovery of the fine scrap has not been consistently high. Furthermore, by this hand puddling procedure there is always considerable danger that enough of the fine particles will rise to the surface of the metal at one particular moment to cause an explosive reaction endangering the workman and equipment.

The bulk of the fine magnesium scrap is produced in machining operations wherein the metallic articles are constantly flooded with oil at the section on which the machining is being performed. The scrap such as turnings, chips, etc. consequently is covered with an oily film which is not, in general practice, removed before the scrap is introduced into the scrap recovery furnace. When this scrap is introduced into the melting furnace, much of the oil comprising the film burns, leaving a deposit of carbon on the scrap, which contaminates the melt after the scrap is fused therewith.

The object of the present invention is to provide apparatus for reclaiming highly oxidizable, relatively finely divided metallic scrap. Another object of the invention is the provision of apparatus for reclaiming highly oxidizable, relatively finely divided metallic scrap and, in particular, finely divided metallic magnesium scrap which has been coated with a film of oil or other volatile matter. Still another object is to provide a process for reclaiming highly oxidizable, relatively finely divided metallic scrap which has been coated with a film of oil or other volatile matter.

The invention broadly consists in bringing finely divided, highly oxidizable metal having a film of oil or other volatile matter thereon into a zone above a melt of metal or salts where the temperature is sufficiently high to volatilize the oil or like matter, progressively passing the scrap through this zone at a rate sufficiently slow to vaporize substantially all of the volatile matter thereby excluding substantially all of the air from the scrap, then submerging the scrap into the melt and there, while agitating the melt, holding the scrap until it is completely fused. Although the melt into which the scrap is submerged is preferably of a composition substantially the same as that of the scrap, any metal in which the scrap is soluble or any salts of lower density than magnesium may be employed as the melt. The invention contemplates the removal of the excess oil and the like which accumulate above the aforementioned zone by condensation of the vapors formed in said zone.

The apparatus for carrying out the present process briefly consists of a furnace in which a melt of metal or salts is held, a vertically disposed conveyor screw and pipe, the lower ends of which are submerged beneath the surface of the melt, a hopper for feeding scrap to the conveyor screw and pipe, a drain near the base of the hopper for collecting the volatile matter whether in the gaseous or liquid state, an adjustable baffle disposed horizontally in the melt for holding the scrap beneath the surface of the metal until it is completely fused with the melt, and a means for rotating the conveyor screw. So that the present invention may be more clearly understood, reference is now made to one embodiment thereof. In the drawing which clearly illustrates this embodiment, the figure is an elevation of the apparatus showing the furnace and various parts of the scrap feeding mechanism in cross section.

The furnace with which the scrap feeding mechanism cooperates is a conventional melting or holding furnace for light metals such as magnesium, and consists of a refractory, lined, cylindrical fuel combustion chamber 1, port 2 through which a gaseous combustion mixture is admitted, and removable crucible 3 which is supported in the combustion chamber by flange 4 on plate 5. The exhaust escapes from combustion chamber 1 through horizontal slots 6 in the bottom side of flange 4.

In the scrap feeding mechanism a base plate 7 which completely covers the top of crucible 3 and rests on flange 4 forms a support for frame 8, scrap hopper 9, and vertically disposed conveyor pipe and screw 10 and 11. An opening and cover therefor, not shown in the drawing, are provided in plate 7 so that the furnace operator may add fluxing material to the melt in the crucible and remove excess dross from the surface of the melt while the scrap recovery operation is in progress. The opening is not used to withdraw metal since the feeding mechanism is removed from the furnace when the crucible has been filled and the metal is ready for use. Scrap hopper 9, which is funnel-shaped, is supported at its top by frame 8 and at its bottom by plate 7, and opens into lower section 12 of conveyor pipe 10 in which screw 11 rotates. The lower section 12 of the conveyor pipe is rigidly supported by base plate 7 and is integrally joined to the base of hopper 9, forming a continuous and smooth surface at the point of juncture between the hopper and section 12.

Section 12 opens into the melt near the bottom of the crucible, and when the apparatus is in operation, the lower end of this section is always below the surface of the melt. An upper section 13 of conveyor pipe 10 is provided to form a support and shield for screw 11. The upper section, which is rigidly secured in frame 8 by brackets 20 and 21, supports bearing 22, in which the shaft of screw 11 is journalled. Screw 11, which extends the full length of sections 13 and 14 and the space therebetween at the bottom of the hopper, projects a short distance below the lower end of section 12 into the melt near the bottom of the crucible. When the apparatus is in operation, the rotation of the lower end of the screw, being exposed to the melt, agitates the molten metal and thereby facilitates fusion of the scrap with the melt, and expulsion of any volatile matter present in the melt. The screw extending the full length of section 12 seals this section from downward currents of air, thus preventing the oily vapors and scrap from burning in this high temperature zone. Any air which is carried into section 12 with the scrap by screw 11 is expelled by the ascending oily vapors. By this construction a non-oxidizing atmosphere is maintained in section 12 throughout the feeding operation.

Screw 11 may be rotated by any suitable power means, but an air driven motor, shown at 23, is preferably employed in the present apparatus since choking which may occur in section 12 prevents the screw from rotating. An air driven motor will stop without causing injury thereto and can be readily reversed to reopen the conveyor pipe.

As the solid pieces of magnesium scrap are discharged from the conveyor pipe into the melt, they immediately proceed to rise to the surface where, upon contacting the atmosphere, they readily burn. To prevent the solid pieces of scrap from rising to the surface, the present invention contemplates the use of a baffle 24 positioned in the melt above the lower end of the conveyor pipe. Since the dross which unavoidably accumulates in the melt tends also to rise to the surface, the baffle is preferably perforated with holes small enough to prevent the scrap from passing through the baffle but large enough to permit the dross to pass, thus preventing the dross from collecting under the baffle. By this arrangement the dross collects on the surface, where it can be readily removed while the apparatus is in operation.

The baffle 24 is suspended in the melt by two small steel cables 25 and 26 which run over pulleys 27 and 28 and coil on reels 29 and 30 respectively. The baffle is raised or lowered in the melt by turning crank 31 which in turn rotates shaft 32 and reels 29 and 30, and then is maintained at the desired level by a ratchet indicated by reference numeral 33. Shaft 32 is journalled in bearings 34 and 35. To steady baffle 24 and to maintain it in a horizontal position in the melt, sleeve 40 is provided which is slidably mounted over section 12 of the conveyor pipe and which is rigidly secured to the baffle. Holes 41 and 42 are provided in base plate 7 and baffle 24 for inserting thermocouple 43 in the melt. It is not essential that a close fit be provided between the sides of the baffle and the sides of the crucible since most of the particles of scrap in the melt rise nearer the central portion of the melt; this, therefore, permits the use of standard tapered walled crucibles by the present invention.

Referring now to the means for removing oil and other volatile matter, a plurality of holes 44 are disposed in hopper 9 near the base thereof, which holes communicate with annular gutter 45. This gutter, which is rigidly secured and tightly sealed to the outside of the hopper, communicates through pipe 46 with a vacuum apparatus, not shown, for forcibly withdrawing the volatile matter from the base of the hopper. By employing vacuum to withdraw the volatile matter, not only is most of the liquid removed through gutter 45 and pipe 46, but much of the gaseous matter which would pass off into the atmosphere and contaminate the air in the plant is also collected.

In placing the scrap feeding mechanism in operating position on the furnace and in removing it therefrom, the whole mechanism must be lifted by some means such as an overhead crane. To provide a convenient place on which a lifting mechanism may be attached, eye 47 in arm 48 is located at the top and center of the mechanism. To facilitate centering the mechanism on the crucible when it is swung into position, lugs 49 are provided on the bottom side of base plate 7, which fit into the top of the crucible.

In the operation of the present apparatus the feeding mechanism is placed in position on the furnace as shown in the drawing, and a sufficient amount of melt is provided in crucible 3 to cover the lower end of section 12 and plate 24, the surface of the melt preferably being somewhat lower than that shown in the drawing. Magnesium scrap such as lathe turnings having a film of oil thereon is placed in hopper 9 and rotation of screw 11 is started. As the screw rotates, the scrap in the bottom of the hopper is carried down into section 12 of the conveyor pipe wherein the scrap becomes progressively hotter as the melt is approached. At some point within this section but above the melt, the temperature becomes sufficiently high to volatilize the oil on the surface of the scrap, thereby forming an inert atmosphere in section 12 which, by replacing the air therein, prevents the scrap from oxidizing. With the continued operation of the apparatus, the oil vapor becomes more dense and rises into the hopper where the vapor and condensed oil are withdrawn through holes 44, gutter 45, and pipe 46 by a suitable vacuum means with which the pipe communicates. The scrap from which the oil has been removed is introduced into the melt at the lower end of section 12 by screw 11 and is quickly dispersed therein by the melt being agitated by the rotation of the lower end of the screw. The scrap, being somewhat lighter than the melt, ascends therein until it contacts baffle 24 where it remains until it has completely fused with the melt. The dross and the gas which have been introduced into the melt pass upwardly through the holes in the baffle to the suface of the melt. As the operation proceeds, and the level of the melt rises, baffle 24 is raised intermittently by the operator to provide a greater volume of melt below the baffle in which the scrap may melt. When the crucible has become filled with molten metal by the introduction of scrap, the feeding mechanism is removed from the furnace.

In a modification of the present invention, a floating baffle is employed in place of the manually adjustable baffle shown in the drawing. The floating baffle, which is substantially the same as the manually operated baffle except for air chambers which are provided to give the baffle sufficient buoyancy to remain near the surface of the melt at all times, progressively provides an increased volume of molten metal in which the scrap may melt.

In the appended claims the word "melt" includes any molten metal, flux or salt which is suitable for the present operation.

I claim:

1. A process for reclaiming metal values from finely divided oxidizable metal scrap contaminated with oil consisting in forming a melt of metal in a furnace, positively and progressively bringing the said scrap into and through a zone above said melt out of contact with the furnace atmosphere heated to a sufficiently high temperature to vaporize the oil, withdrawing at least a portion of said oil vapor and liquid condensed therefrom adjacent the upper end of said heated zone but below the top of the scrap charge and passing said scrap from said zone into and below the surface of the molten metal without contact with the furnace atmosphere.

2. A process for reclaiming metal values from oxidizable metal scrap contaminated with volatilizable matter capable of forming a protective atmosphere for said metal at an elevated temperature consisting of forming a melt in a furnace, passing said scrap into and through a zone heated to a temperature sufficiently high to vaporize the volatilizable matter and out of contact with the furnace atmosphere, positively withdrawing at least a portion of the vapor so formed and liquid associated therewith adjacent the upper end of said zone but below the top of the scrap charge, and passing the treated scrap into and below the surface of the melt without contact with the furnace atmosphere.

3. A process for reclaiming metal values from oxidizable metal scrap contaminated with volatilizable matter capable of forming a protective atmosphere for said metal at an elevated temperature consisting of forming a melt in a furnace, forming the cold scrap into a downwardly moving mass outside said furnace, passing said mass of scrap into and through a zone heated to a temperature sufficiently high to vaporize the volatilizable material and out of contact with the furnace atmosphere, positively withdrawing at least a portion of the vapor so formed and any liquid associated therewith adjacent the upper end of said zone but below the top of the scrap charge and passing the treated scrap into and below the surface of the melt without contact with the furnace atmosphere.

4. A process for reclaiming metal values from finely divided oxidizable metal scrap contaminated with volatilizable matter capable of forming a protective atmosphere for said metal at an elevated temperature consisting of forming a melt in a furnace to receive said scrap metal, forming the cold scrap into a downwardly moving mass outside said furnace, passing said mass of scrap into and through a zone adjacent said melt heated to a temperature sufficiently high to vaporize the volatilizable material and out of contact with the furnace atmosphere, positively withdrawing at least a portion of the vapor so formed and any liquid associated therewith adjacent the upper end of said zone but below the top of the scrap charge, passing the treated scrap into and below the surface of the melt without contact with the furnace atmosphere and agitating said scrap with the melt.

5. A process for reclaiming metal values from finely divided magnesium scrap contaminated with oil consisting of forming a melt of magnesium in a furnace, forming the cold scrap into a downwardly moving mass outside said furnace, passing said mass of scrap into and through a zone adjacent said melt out of contact with the furnace atmosphere and heated to a temperature sufficiently high to vaporize the oil, positively withdrawing at least a portion of the vapor so formed and any liquid associated therewith adjacent the upper end of said heated zone but below the top of the scrap charge, passing the treated scrap into and below the surface of the melt without contact with the furnace atmosphere, positively agitating said scrap with the melt while holding it below the surface of said melt.

FRANK D. CHEW.

REFERENCES CITED

The following references are of record in the file of this patent:

UNITED STATES PATENTS

| Number | Name | Date |
|---|---|---|
| 969,253 | Diack | Sept. 6, 1910 |
| 1,513,875 | Wilke | Nov. 4, 1924 |
| 1,904,781 | Crawford | Apr. 18, 1933 |
| 2,300,141 | Whitzel | Oct. 27, 1942 |

FOREIGN PATENTS

| Number | Country | Date |
|---|---|---|
| 414,577 | Great Britain | Aug. 9, 1934 |